(12) United States Patent
Tuncer

(10) Patent No.: US 8,593,782 B1
(45) Date of Patent: Nov. 26, 2013

(54) CLAD FIBER CAPACITOR AND METHOD OF MAKING SAME

(71) Applicant: Enis Tuncer, Knoxville, TN (US)

(72) Inventor: Enis Tuncer, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 13/711,226

(22) Filed: Dec. 11, 2012

Related U.S. Application Data

(62) Division of application No. 12/838,070, filed on Jul. 16, 2010, now Pat. No. 8,331,076.

(51) Int. Cl.
*H01G 4/30* (2006.01)

(52) U.S. Cl.
USPC .............. 361/301.4; 361/301.2; 361/303; 361/305; 361/306.2; 361/321.1

(58) Field of Classification Search
USPC ........... 361/301.4, 301.2, 303–305, 311–313, 361/321.1, 321.2, 306, 2
See application file for complete search history.

(56) References Cited

U.S. PATENT DOCUMENTS

| | | |
|---|---|---|
| 2,939,059 A | 5/1960 | Gravley |
| 3,988,489 A | 10/1976 | George et al. |
| 4,945,449 A | 7/1990 | Cansell et al. |
| 5,158,647 A | 10/1992 | Hurley |
| 5,366,920 A * | 11/1994 | Yamamichi et al. .......... 438/396 |
| 5,370,677 A * | 12/1994 | Rudie et al. ................... 607/101 |
| 5,682,288 A | 10/1997 | Wani |
| 5,766,789 A | 6/1998 | James et al. |
| 5,898,561 A * | 4/1999 | Mandelcorn et al. ....... 361/301.4 |
| 6,120,326 A * | 9/2000 | Brooks ..................... 439/620.09 |
| 6,404,615 B1 * | 6/2002 | Wijeyesekera et al. ..... 361/306.1 |
| 6,449,139 B1 | 9/2002 | Farahmandi et al. |
| 6,451,485 B1 | 9/2002 | James et al. |
| 6,642,552 B2 * | 11/2003 | Stern ............................. 257/195 |
| 7,150,904 B2 | 12/2006 | D'Urso et al. |
| 7,258,731 B2 | 8/2007 | D'Urso et al. |
| 7,486,498 B2 | 2/2009 | Welsch et al. |
| 7,697,807 B2 | 4/2010 | D'Urso et al. |
| 7,697,808 B2 | 4/2010 | D'Urso et al. |
| 2003/0135971 A1 | 7/2003 | Liberman et al. |
| 2010/0177461 A1 | 7/2010 | Tuncer |
| 2010/0178418 A1 | 7/2010 | Tuncer |
| 2012/0014035 A1 | 1/2012 | Tuncer |

FOREIGN PATENT DOCUMENTS

JP 2005-294607 10/2005

OTHER PUBLICATIONS

J. Gotro et al., "An Improved Laminate for Embedded Capacitance Applications," AlliedSignal Laminate Systems, IPC Expo '99, Long Beach, California, Mar. 1999 (5 pages).
S. Lu et al., "Photoconductivity in single wall carbon nanotube sheets," Nanotechnology, vol. 17, No. 8, 2006 (4 pages).

(Continued)

*Primary Examiner* — Nguyen T Ha
(74) *Attorney, Agent, or Firm* — Pauley Petersen & Erickson

(57) ABSTRACT

A clad capacitor and method of manufacture includes assembling a preform comprising a ductile, electrically conductive fiber; a ductile, electrically insulating cladding positioned on the fiber; and a ductile, electrically conductive sleeve positioned over the cladding. One or more preforms are then bundled, heated and drawn along a longitudinal axis to decrease the diameter of the ductile components of the preform and fuse the preform into a unitized strand.

5 Claims, 3 Drawing Sheets

(56) References Cited

OTHER PUBLICATIONS

S. E. Creager et al., "Fibers for Textile-Based Electrical Energy Storage," NTC Project M06-CL07, National Textile Center Annual Report, Nov. 2006 (9 pages).

P. Potschke et al., "Dielectric spectroscopy on melt processed poly carbonate-multiwalled carbon nanotube composites," Polymer, vol. 44, Issue 17, Aug. 2003, pp. 5023-5030.

E. Tuncer, "Structure-property relationship in dielectric mixtures: application of the spectral density theory," J of Physics D: Appl. Phys., vol. 38, Jan. 2005, pp. 223-234.

* cited by examiner

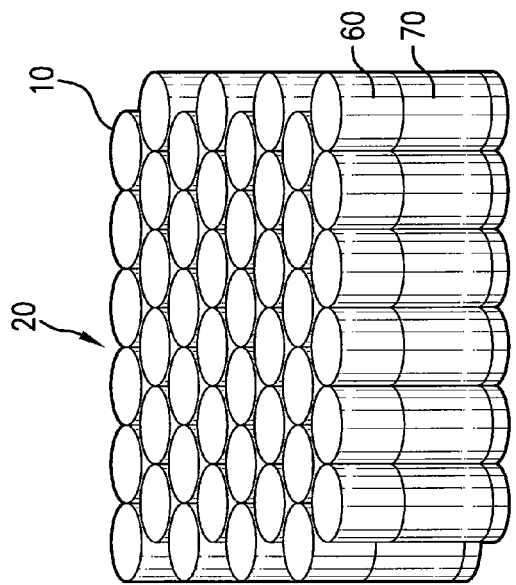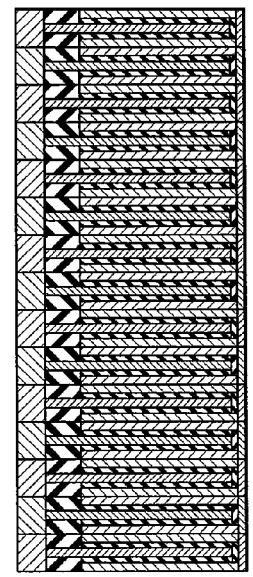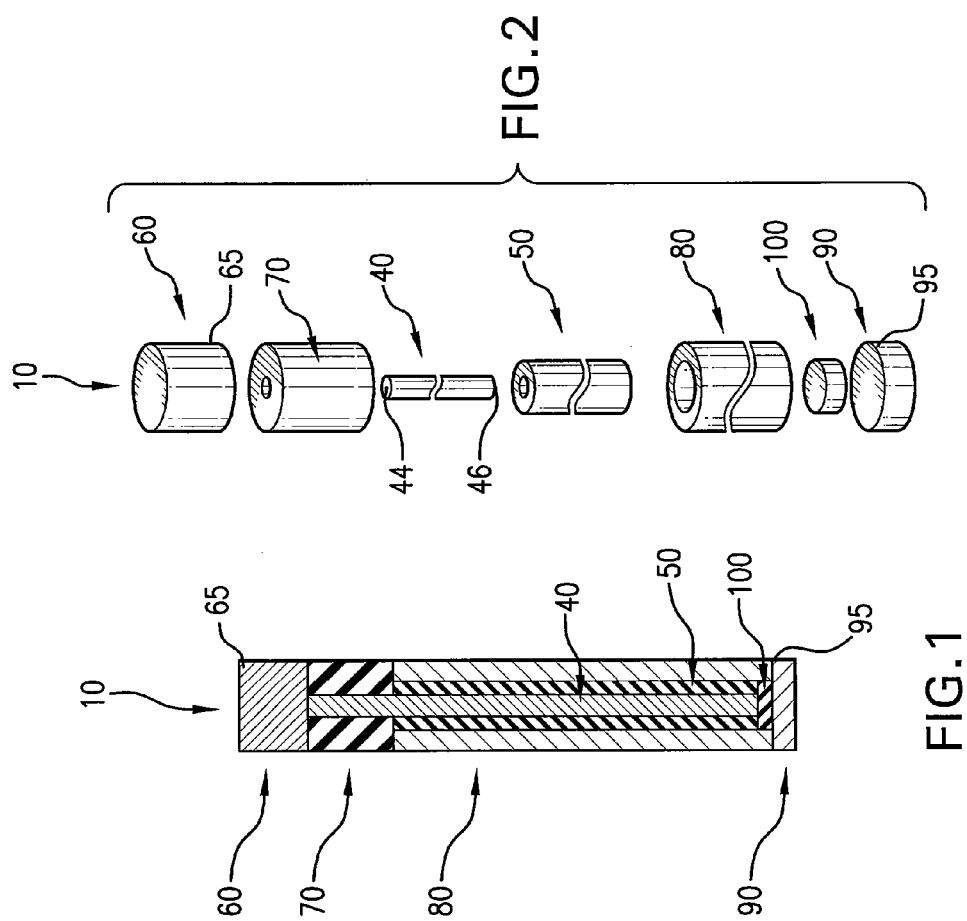

US 8,593,782 B1

CLAD FIBER CAPACITOR AND METHOD OF MAKING SAME

CROSS REFERENCE TO RELATED APPLICATIONS

This application is a divisional patent application of U.S. patent application Ser. No. 12/838,070, filed 16 Jul. 2010.

GOVERNMENT RIGHTS

This invention was made with government support under Contract No. DE-ACO5-00OR22725 awarded by the U.S. Department of Energy. The government has certain rights in the invention.

FIELD OF THE INVENTION

The present invention relates to fabrication of high energy density capacitor devices using a drawn preform.

BACKGROUND OF THE INVENTION

Capacitors generally comprise two conductors, such as parallel metal plates, insulated from each other by a dielectric and are typically used to store electric energy. Current capacitors generally have low power densities and cannot effectively operate or maintain operation at high temperatures.

As such, there exists a need for capacitors that are operable at high temperatures with sufficient capacity for use in specialized applications like defense, aerospace and transportation. Likewise, a need exists for a capacitor for use in such applications that is physically adaptable to various form factors.

SUMMARY OF THE INVENTION

A capacitor according to the subject invention is constructed using one or more preforms as the building blocks for a desired capacitor. Each preform preferably includes a ductile, electrically conductive fiber and a corresponding ductile, electrically insulating cladding positioned around the fiber.

A ductile, electrically conductive sleeve is preferably positioned over the cladding so that the fiber is electrically insulated from the sleeve by the cladding. A first means for electrical contact is preferably positioned at one end of the fiber that is electrically insulated from the sleeve. A second means for electrical contact is preferably positioned at an opposite end of the fiber and is insulated from the first means.

A ductile, electrically insulating spacer is preferably positioned between the first means and the sleeve to electrically insulate the first means from the second means. The spacer is preferably constructed from a same, similar or otherwise compatible material as the cladding and preferably includes an outer diameter greater than an outer diameter of the cladding.

A plurality of preforms may be assembled into a bundle so that the first means for electrical contact in each preform are disposed in direct communication with the first means for electrical contact in each adjacent preform in the bundle. The bundle is then preferably drawn to a desired length and diameter resulting in a capacitor strand. The resulting strand can be wound and/or woven and formed into fabric and even clothing to provide wearable energy storage units.

The diameter of the dielectric layer of the cladding, the length of the fiber and the number density of the preforms determines the capacitance of the device, together with the pulling parameters. Once the preform structure is constructed, it can be pulled and the structure shrunk to a smaller size. For example, an initial size of 1 inch diameter of the preform and a height of 8 inches may be transformed to a 0.01 inch diameter and 800 inch long strand after pulling. If the initial capacitance of the structure is 100 pf, the final capacitance would be approximately 1 uF. If a stack of preforms are used, for example, 100, this value would be a multiplier for the capacitance. Since the materials that are considered for fabrication of the preforms according to this invention are high temperature materials, capacitor devices with high power densities can be fabricated for high temperature, high power density application needs, such as in power electronic circuits in the transportation, space and defense industries.

BRIEF DESCRIPTION OF THE DRAWINGS

The above-mentioned and other features and objects of this invention will be better understood from the following detailed description taken in conjunction with the drawings wherein:

FIG. 1 is a schematic cross-sectional side view of a single sub-element according to one preferred embodiment of this invention;

FIG. 2 is a schematic exploded side view of a single sub-element according to one preferred embodiment of this invention;

FIG. 3 is a schematic perspective side view of a preform comprising a plurality of sub-elements according to one preferred embodiment of this invention;

FIG. 4 is a schematic cross-sectional side view of a preform comprising a plurality of sub-elements according to one preferred embodiment of this invention;

DETAILED DESCRIPTION OF THE INVENTION

Figure 5:
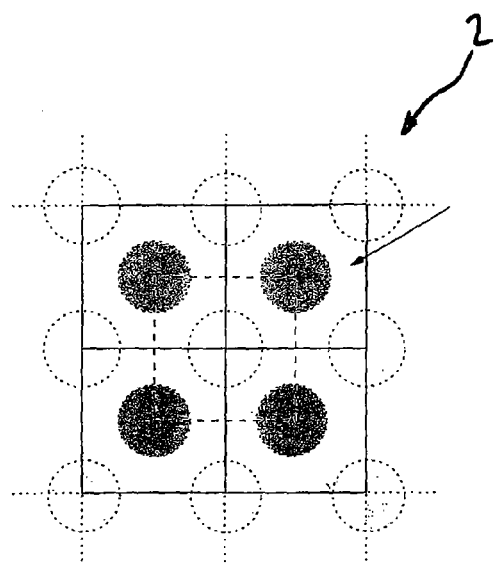
FIG. 5 is a schematic cross-sectional front view of a preform unit cell according to preferred embodiment of this invention.

FIGS. 1-10 show various preferred embodiments of the invention. FIGS. 1 and 2 show a schematic cross-sectional view of a preform 10 according to one preferred embodiment of the invention and an exploded view of a preferred embodiment of the invention, respectively. The preforms 10 in the figures are shown schematically and, as such, the scale and relationship of the various components may be adjusted for clarity and discussion.

FIG. 1 shows the preform 10 for use in a capacitor device, as described in more detail below. As shown, the preform 10 preferably includes a ductile, electrically conductive fiber 40 having a first end 44 and a second end 46. As shown in the figures, the first end 44 is generally aligned toward the top of the figure and the second end 46 is generally aligned toward the bottom of the figure, however no particular fiber alignment is contemplated or required by the subject invention.

According to a preferred embodiment of this invention, the electrically conductive fiber is preferably formed of a conducting or semiconducting material and may comprise a material selected from the group consisting of glass, metal, ceramic, polymer and resin. Examples include stainless steel, copper, aluminum, or nickel wires; solder alloys; metal fiber; silicon carbide or carbon filled glass composites; and semiconducting glasses. Carbon or metal powder filled conducting polymers are also suitable materials.

The preform 10 preferably further includes a ductile, electrically insulating cladding 50 positioned around the fiber 40. According to a preferred embodiment of this invention, the electrically insulating cladding is preferably a dielectric material having a high dielectric permittivity such as glass or polymer but may comprise any suitable material selected from the group consisting of: glass, ceramic, polymer and resin. More specifically, the cladding may be selected from the group consisting of soda-lime glass, boron-silicate glass, potash-lead-silicate glass, polymeric material, and combinations thereof.

In addition, a ductile, electrically conductive sleeve 80 is preferably positioned over the cladding 50 so that the fiber 40 is electrically insulated from the sleeve 80 by the cladding 50. As best shown in FIG. 2, the sleeve 80 may comprise a cylindrical configuration that slides over and surrounds at least a portion of the cladding 50 in a manner resulting in the cross-section shown in FIG. 1.

As shown in FIG. 1, a first means 60 for electrical contact is preferably positioned at the first end 44 of the fiber 40. The first means 60 may comprise a cap 65 positioned at the first end 44 of the fiber 40 and manufactured from a conducting or semiconducting material. The cap 65 is preferably disposed in electrical connection with the first end 44 of the fiber 40 and is electrically insulated from the sleeve 80.

As best shown in FIG. 2, the preform 10 may further include a ductile, electrically insulating endwall 100 positioned at the second end 46 of the fiber 40. Alternatively, the cladding 50 may include a closed ended cylinder so that the fiber 40 may not extend completely therethrough.

The preform 10 may further include a second means 90 for electrical contact at the second end of the fiber 40. The second means 90 for electrical contact is insulated from the first means 60 and may comprise an electrically conductive seat 95 disposed in electrical connection with the second end of the sleeve 80.

FIG. 2 further shows a ductile, electrically insulating spacer 70 positioned between the cap 65 and the sleeve 80. The spacer 70 is preferably positioned around the fiber 40 and between the first means 60 and the sleeve 80 to electrically insulate the first means 60 from the second means 90. The spacer 70 is preferably constructed from a same, similar or otherwise compatible material as the cladding 50. As shown in FIGS. 1 and 2, the spacer 70 preferably includes an outer diameter greater than an outer diameter of the cladding 50. As a result of this relative geometry, the spacer 70 maintains an insulating gap between the first means 60 for electrical contact, or cap 65, and the sleeve 80. Alternatively to the spacer 70 and cladding 50 shown in FIG. 2, a single unitized cladding 50 may be used that may include an integrated shoulder or otherwise include a stepped diameter for maintaining the insulation between the cap 65 and the sleeve 80.

FIGS. 3 and 4 show a corresponding structure of preforms 10 used in the preparation and manufacture of a capacitor as described herein. As described, a plurality of preforms 10 are assembled into a bundle 20 as partially shown schematically in FIG. 3. Each preform 10 of the plurality of preforms 10 preferably includes an identical geometry although this invention additionally contemplates a combination of complementary geometries assembled into a bundle 20. As shown in the figures, the preforms 10 are preferably arranged in the bundle 20 so that the first means 60 for electrical contact in each preform 10 are disposed in direct communication with the first means 60 for electrical contact in each adjacent preform 10 in the bundle 20.

Figure 6:
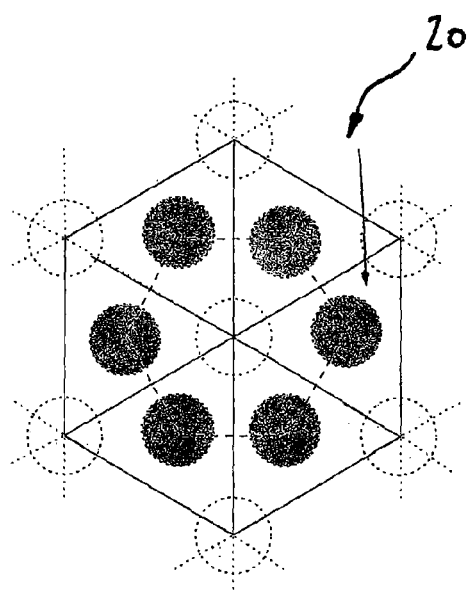
FIG. 6 is a schematic cross-sectional front view of a preform unit cell according to preferred embodiment of this invention.
Figure 7:
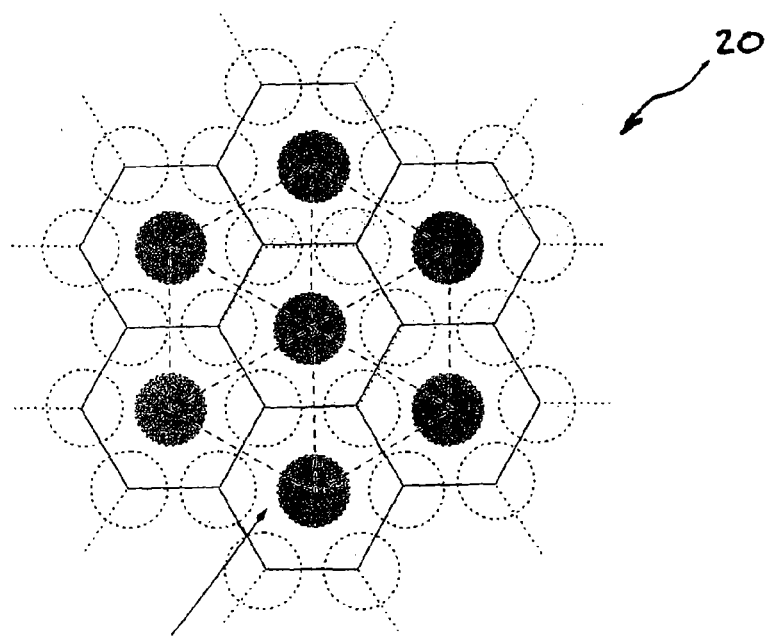
FIG. 7 is a schematic cross-sectional front view of a preform unit cell according to preferred embodiment of this invention.

The bundles 20 may be formed in any desirable geometry so as to affect the desired capacitance, scale and/or shape for a particular application. The bundle 20 may be grouped in bulk, such as shown in FIG. 3 or may be formed into unit cells arranged into a desired lattice such as shown in FIGS. 5-7. FIG. 5 shows a group of unit cells comprising a square lattice, that is, a series of preforms arranged into a square matrix such that preforms are arranged in units of five. FIG. 6 shows a group of unit cells comprising a triangular lattice and FIG. 7 shows a unit cell comprising a hexagonal lattice. Such arrangements may be used to form the desired bundle 20 as described.

Following assembly into the bundle 20, the preforms 10 are heated to a temperature sufficient to soften the ductile components of the preforms 10. The bundle 20 may be heated to a temperature sufficient to soften the materials comprising the bundle 20, but not so high as to cause damage, decomposition or other deleterious changes.

Once heated to a sufficient temperature, the bundle is then drawn along a longitudinal axis of the preforms 10 to reduce an overall diameter of the bundle 20 and extend an overall length of the bundle 20. Specifically, as the diameter of the plurality of ductile preforms is reduced, the preforms 10 are fused together into a single capacitor strand. The drawing action thereby results in a unitized fiber, cladding and sleeve within each preform 10 and a unitized plurality of preforms 10 within the bundle 20. As a result of the drawing process, preforms and/or bundles may be formed having diameters in the nanometer scale.

Alternatively, the drawn bundle may be cut, rebundled and drawn again to further decrease the diameter of the resulting strand and the frequency of the preforms 10 therein. The process of bundling, drawing, and cutting may be performed a single time, particularly for preforms having a directional geometry, or repeated many times until the desired diameter and/or frequency is attained.

Figure 8:
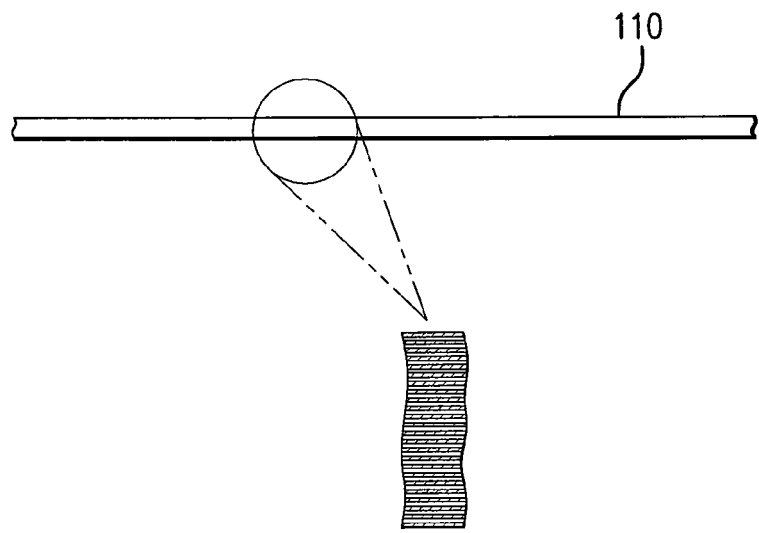
FIG. 8 is a schematic side view of a capacitor strand, including a magnified cross-sectional view of the strand.
Figure 9:
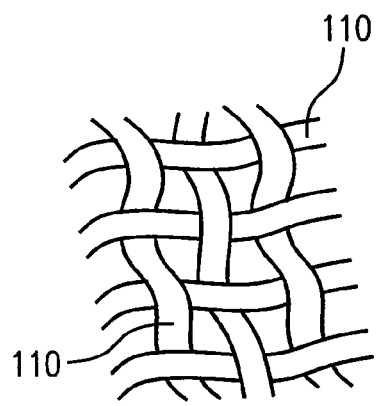
FIG. 9 is a representational view of fabric woven from one or more capacitor strands.
Figure 10:
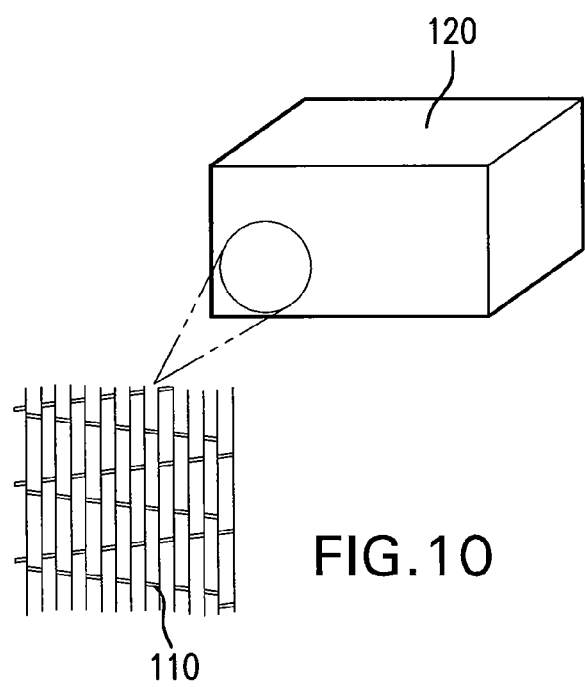
FIG. 10 is a schematic perspective view of a form manufactured in accordance with the invention.

Following the desired drawing, the resulting capacitor strand 110, such as shown in FIG. 8, may be wound onto a spool, woven into fabric, such as shown schematically in FIG. 9, or utilized as is in high-temperature and/or small scale applications requiring capacitors. As a result of the size and flexibility of the capacitor strand, capacitors may be formed having unique geometries, including clothing, vehicle panels and/or upholstery and/or nearly any conceivable shape or size. In addition, the resulting strand may be woven and/or formed, similar to carbon fiber, into a suitable form 120, such as shown in FIG. 10, thereby permitting many further applications.

The resulting capacitor or capacitor strand 110 may be connected to electrodes at the first means 60, or cap 65, and the second means 90, or seat 95, for instance at each end of the capacitor strand, thereby creating an electric capacitance between the fibers when activated.

The diameter of the dielectric layer of the cladding 50, the length of the fiber 40 and the number density of the preforms 10 may be considered to calculate a desired capacitance of the device, together with the pulling parameters. Once the preform 10 is constructed, it can be pulled and the structure shrunk to a smaller size. For example, an initial size of 1 inch diameter of the preform 10 and a height of 8 inches may be transformed to a 0.01 inch diameter and 800 inch long strand after pulling. If the initial capacitance of the structure is 100 pf, the final capacitance would be approximately 1 uF. If a stack or bundle of preforms 10 are used, for example, one hundred, this value would be a multiplier for the capacitance. Since the materials that are considered for fabrication of the preforms 10 according to this invention are high temperature materials, capacitor devices with high power densities can be fabricated for high temperature, high power density application needs, such as in power electronic circuits in the transportation, space and defense industries.

While there has been shown and described what are at present considered the preferred embodiments of the invention, it will be obvious to those skilled in the art that various changes and modifications can be prepared therein without departing from the scope of the inventions defined by the appended claims.

What is claimed is:

1. A method of manufacturing a capacitor comprising:
    a. providing a plurality of preform units, each of the preform units comprising:
        i. a ductile, electrically conductive fiber having a first end and a second end;
        ii. a ductile, electrically insulating cladding disposed on the fiber;
        iii. a first means for electrical contact disposed in electrical connection with the first end of the fiber;
        iv. a ductile, electrically insulating endwall disposed on the second end of the fiber and in contact with the cladding;
        v. a ductile, electrically conductive sleeve having a first end and a second end, the sleeve disposed over the cladding so that the first end is oriented toward the first end of the fiber but is electrically insulated from the first means for electrical contact, and so that the second end is oriented toward the second end of the fiber; and
        vi. a second means for electrical contact disposed in electrical connection with the second end of the sleeve;
    b. arranging the plurality of preforms into a bundle;
    c. heating the bundle to a temperature sufficient to soften ductile components of the preforms; and
    d. drawing the bundle along a longitudinal axis of the plurality of fibers to decrease a diameter of the bundle and fuse the preforms together into a single capacitor strand.

2. The method of manufacture of claim 1 wherein the preform further comprises:
    a ductile, electrically insulating spacer positioned around the fiber and between the first means and the sleeve to electrically insulate the first means from the second means.

3. The method according to claim 1 further comprising:
    winding the single capacitor strand onto a spool.

4. The method according to claim 1 further comprising:
    weaving the single capacitor strand into a fabric.

5. The method according to claim 1 further comprising:
    arranging the preforms in the bundle so that the first means for electrical contact in each preform are disposed in direct communication with the first means for electrical contact in each adjacent preform in the bundle.

* * * * *